(12) United States Patent
Long, Sr.

(10) Patent No.: US 6,685,043 B1
(45) Date of Patent: Feb. 3, 2004

(54) QUICK FILL

(75) Inventor: Charles E. Long, Sr., Rockledge, FL (US)

(73) Assignee: Common Sense Management, Inc., Rockledge, FL (US)

( * ) Notice: Subject to any disclaimer, the term of this patent is extended or adjusted under 35 U.S.C. 154(b) by 226 days.

(21) Appl. No.: 09/961,719

(22) Filed: Sep. 24, 2001

(51) Int. Cl.[7] ............................................... B65D 51/16
(52) U.S. Cl. ..................... 220/254.5; 220/303; 220/304; 220/86.2
(58) Field of Search .................... 220/DIG. 33, 303, 220/304, 86.3, 86.2, 86.1, 254.5, 327, 378

(56) References Cited

U.S. PATENT DOCUMENTS

| | | | | |
|---|---|---|---|---|
| 1,742,700 A | * | 1/1930 | Fisher ...................... | 220/254.5 |
| 1,818,608 A | * | 8/1931 | Chafkin ................... | 220/254.5 |
| 2,503,031 A | * | 4/1950 | Davidson .................. | 220/86.2 |
| 2,534,003 A | * | 12/1950 | Culver et al. .............. | 220/86.2 |
| 2,551,058 A | * | 5/1951 | Selzler et al. ............. | 220/86.2 |
| 2,657,824 A | * | 11/1953 | Mariani ..................... | 220/86.3 |
| 2,765,948 A | * | 10/1956 | Paley et al. ............... | 220/254.5 |
| 2,835,269 A | * | 5/1958 | Seymour .................... | 137/467 |
| 3,730,216 A | * | 5/1973 | Arnett et al. .............. | 220/86.2 |
| 4,265,752 A | * | 5/1981 | O'Banion ................. | 220/254.5 |

FOREIGN PATENT DOCUMENTS

JP          8-216705       * 8/1996

* cited by examiner

Primary Examiner—Nathan J. Newhouse
(74) Attorney, Agent, or Firm—Brian S. Steinberger; Law Offices of Brian S. Steinberger, P.A.

(57) ABSTRACT

A fuel cap assembly for use on fuel tanks on large vehicles such as straight trucks and buses for reducing and preventing fuel fumes and spills from reaching outside of the fuel tank during fuel filling operations. The cap assembly has interior facing threads that wrap about exterior facing threads on the fuel receiving receptacles on the fuel tanks. The cap assembly includes a lid having a normally biased closed door that only opens when a fuel nozzle is pressed into the door. The cap assembly can be elongated to allow for an interior chamber that allows for an extra catch to stop fuel from reaching outside the tank during the filling of the fuel tank. An O-ring type seal also helps lockably seal the cap assembly to the fuel tank receptacle.

20 Claims, 4 Drawing Sheets

QUICK FILL

This invention relates to fuel caps, and in particular to a quick fill fuel cap for large vehicles such as trucks, buses having external type fuel tanks.

BACKGROUND AND PRIOR ART

A common problem with filling fuel tanks is that fuel can easily spill out as a nozzle is being used to fill a tank. For example, the fuel pump nozzle generally has a smaller diameter than the tank fuel valve receptacle opening in which the nozzle is inserted. As fuel is flowing into the tank, the splashing of the fuel within the tank can overspill outside the tank. The resultant exterior spillage can be dangerous due to the combustible volatility of the fuel, as well as be a waste of the valuable fuel being lost and unusable. Current fuel spills require extensive cleanup steps to comply with EPA(Environmental Protection Agency) type regulations such as pouring absorption materials on the fuel spill itself, collecting absorption material and spilled fuel, and properly disposing of it in accordance with the EPA type regulations. Additionally, the fuel spills can damage surrounding vehicle paint, and further stain clothing as well as cause other problems. Still furthermore, the small diameter of the nozzle allows noxious and dangerous fumes to escape around the nozzle as the nozzle is being used to fill the tank. Additionally, when tanks are being filled it is normal for the cap to be totally removed from the tank, which can result in the user either or both forgetting to replace the cap cover or losing the cap cover. Clearly, driving a vehicle without fuel cap covers is unsafe and dangerous to the drivers and passengers of the vehicles, the vehicle itself, and surrounding vehicles.

In the past, automobiles have used a no spill type cap cover. However, the automobile caps have bottom plug portions with exterior facing threads that insert into the mouth of the tank valve receptacle. Automobiles almost always use their fuel caps within a protected compartment that usually has a fuel cover for protecting the fuel cap. These automobile caps would be useless with exterior fuel tanks on large vehicles such as trucks, and buses. The exterior fuel tanks on the truck and large vehicles have no protected compartment, and must have a large enough and durable cap that can be used to both close off access to the fuel and be protected from the elements. Thus, the automobile caps are too small and not durable enough to be used with the large fuel receptacle ports on exterior tanks of large vehicles such as trucks, and buses. The size and dimensions of automobile fuel caps could create potentially dangerous conditions if the small automobile fuel cover falls off the exterior tanks.

SUMMARY OF THE INVENTION

The primary objective of the invention is to provide a fuel cap for external fuel tanks on vehicles such as straight trucks, and buses that prevents or reduces fuel spillage while the tank is being filled.

The secondary objective of the invention is to provide a fuel cap for external fuel tanks on vehicles such as trucks, and buses that prevents or reduces fumes from being released while the tanks is being filled.

The third objective of the invention is to provide a fuel cap for external fuel tanks on vehicles such as trucks and buses that does not need to be removed when the tanks are being filled with fuel.

The fourth objective of the invention is provide a fuel cap for use with fuel tanks on straight type trucks and buses that prevents fuel spills when the cap is left off or comes off when not properly replaced after filling the tank. By preventing fuel spills with the novel fuel cap, the extensive cleanup and disposal type statutory requirements for spilt fuel can be avoided.

A preferred embodiment has a multi-part cap assembly with a lid portion attached to a main housing with a sealing gasket therebetween, and fasteners such as screws attaching the parts together. A hinge biased closed retractable door in the lid portion is sized large enough to barely allow for a fuel nozzle tip to be inserted into the assembly. An O-ring further allows for the assembly to be sealed against and to lock to a fuel receptacle opening on a fuel tank. An enlarged cavity inside of the assembly allows for the cap assembly to catch spills before the fuel can spill outside the assembly. The cap assembly can be elongated to act as an extender to allow fuel to reach the fuel tank without having the fuel nozzle touch the receptacle opening to the fuel tank.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
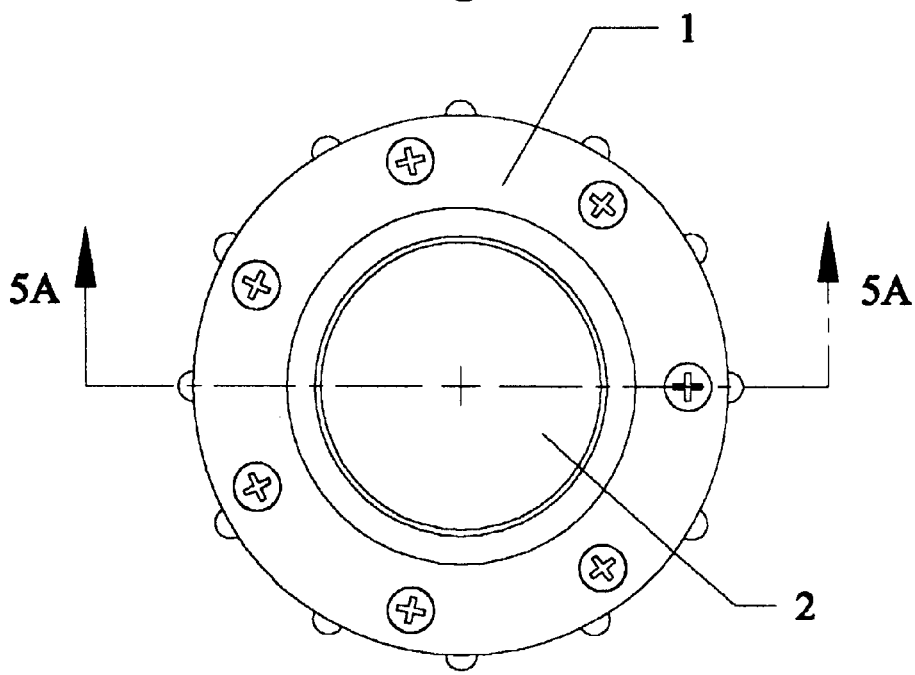
FIG. 1 is a top view of the fuel cap assembly invention.
Figure 2:
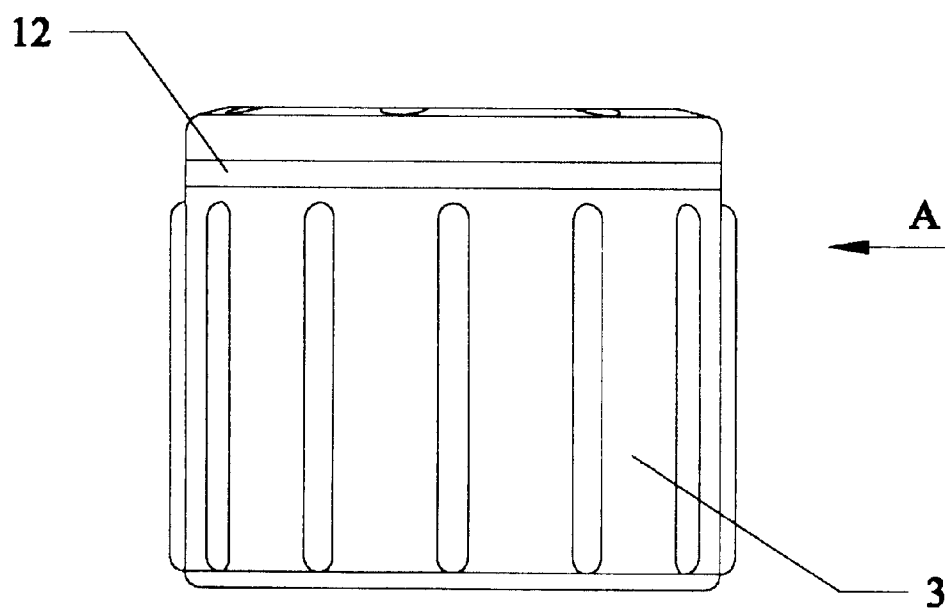
FIG. 2 is a side view of the fuel cap assembly of FIG. 1 along arrow A.
Figure 3:
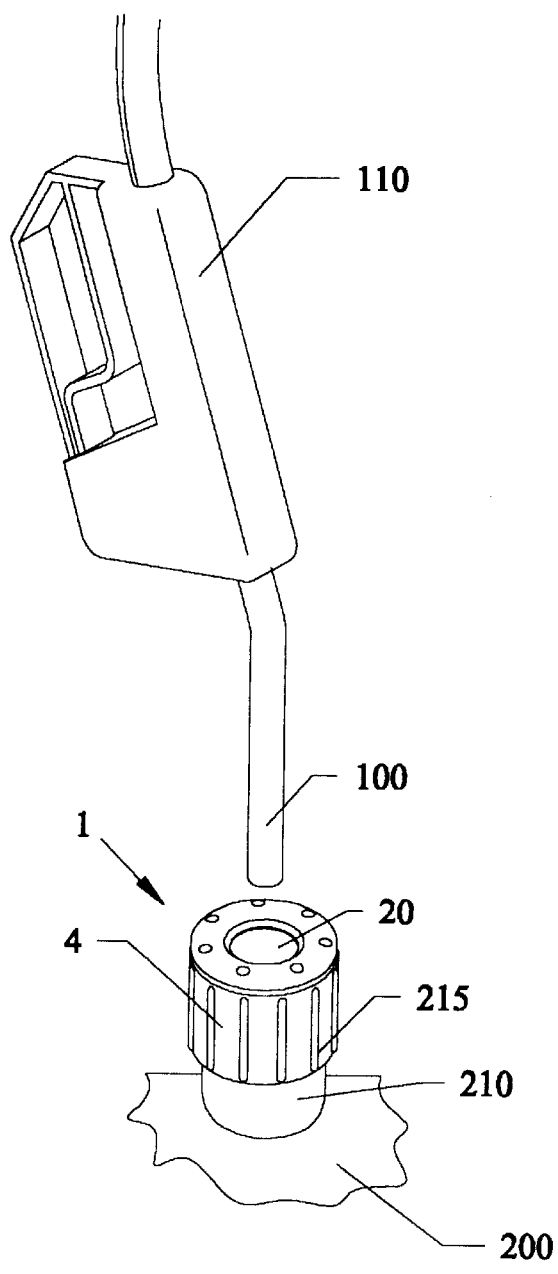
FIG. 3 shows the fuel cap assembly of FIGS. 1–2 attached to a fuel tank having external threads about the fuel tank receptacle opening with a fuel nozzle approaching the cap assembly.
Figure 4:
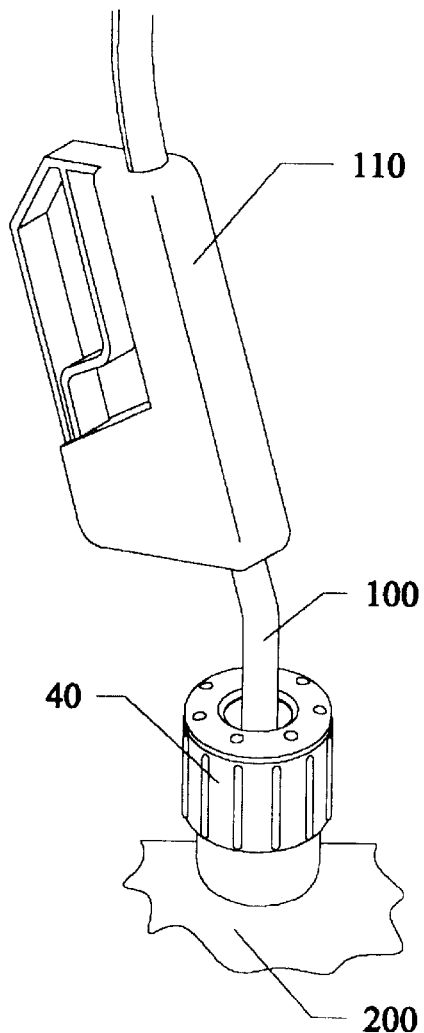
FIG. 4 shows the fuel nozzle of FIG. 3 penetrating the cap assembly and fuel tank of FIG. 3.
Figure 5:
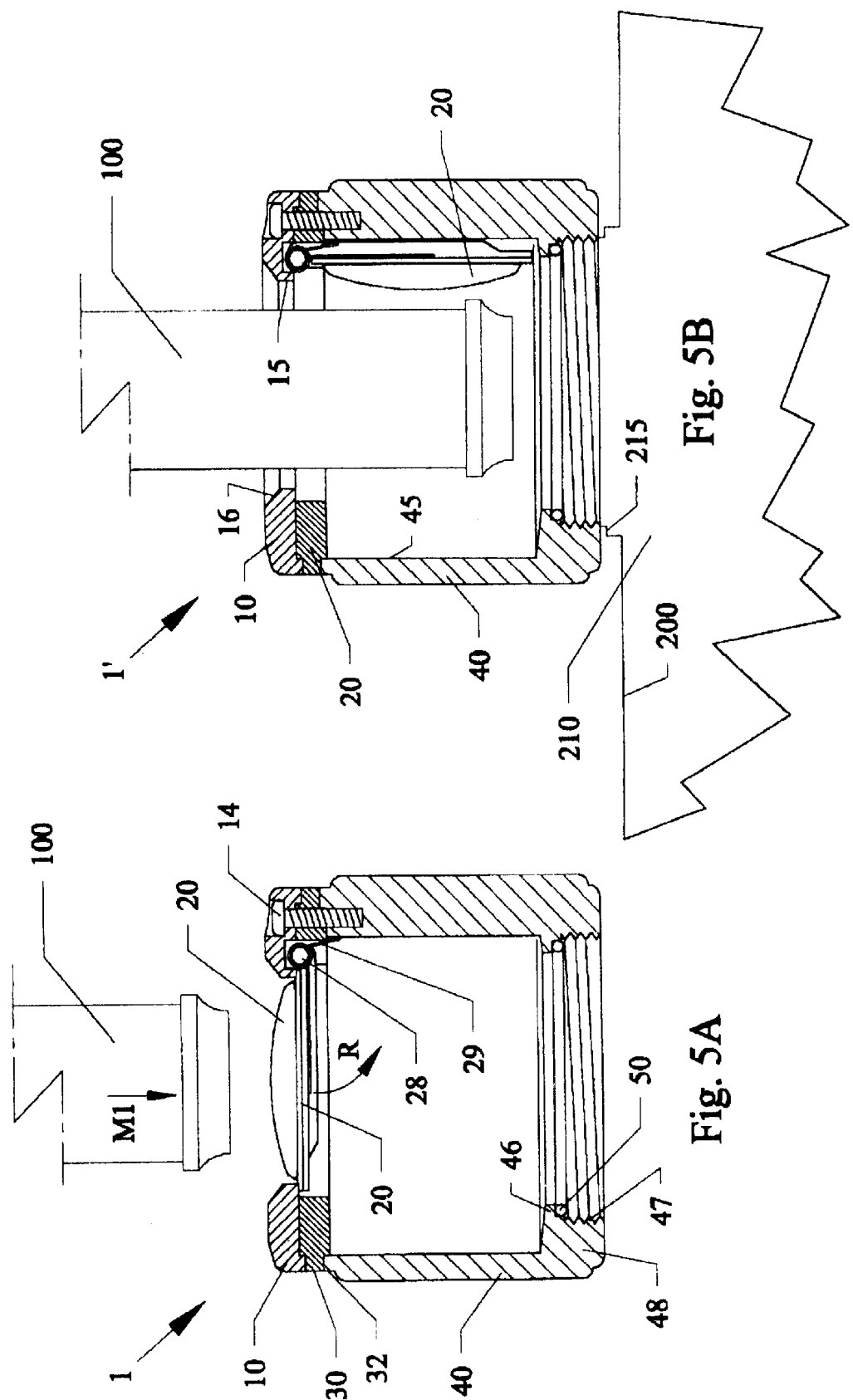
FIG. 5A is a cross-sectional view of the cap assembly of FIG. 1 along arrows 5A with the fuel nozzle of FIG. 3 positioned above the cap assembly
FIG. 5B is another view of the cap assembly of FIG. 5A attached to a receptacle tank receptacle, with the nozzle inserted through the door of the fuel cap assembly.
Figure 6:
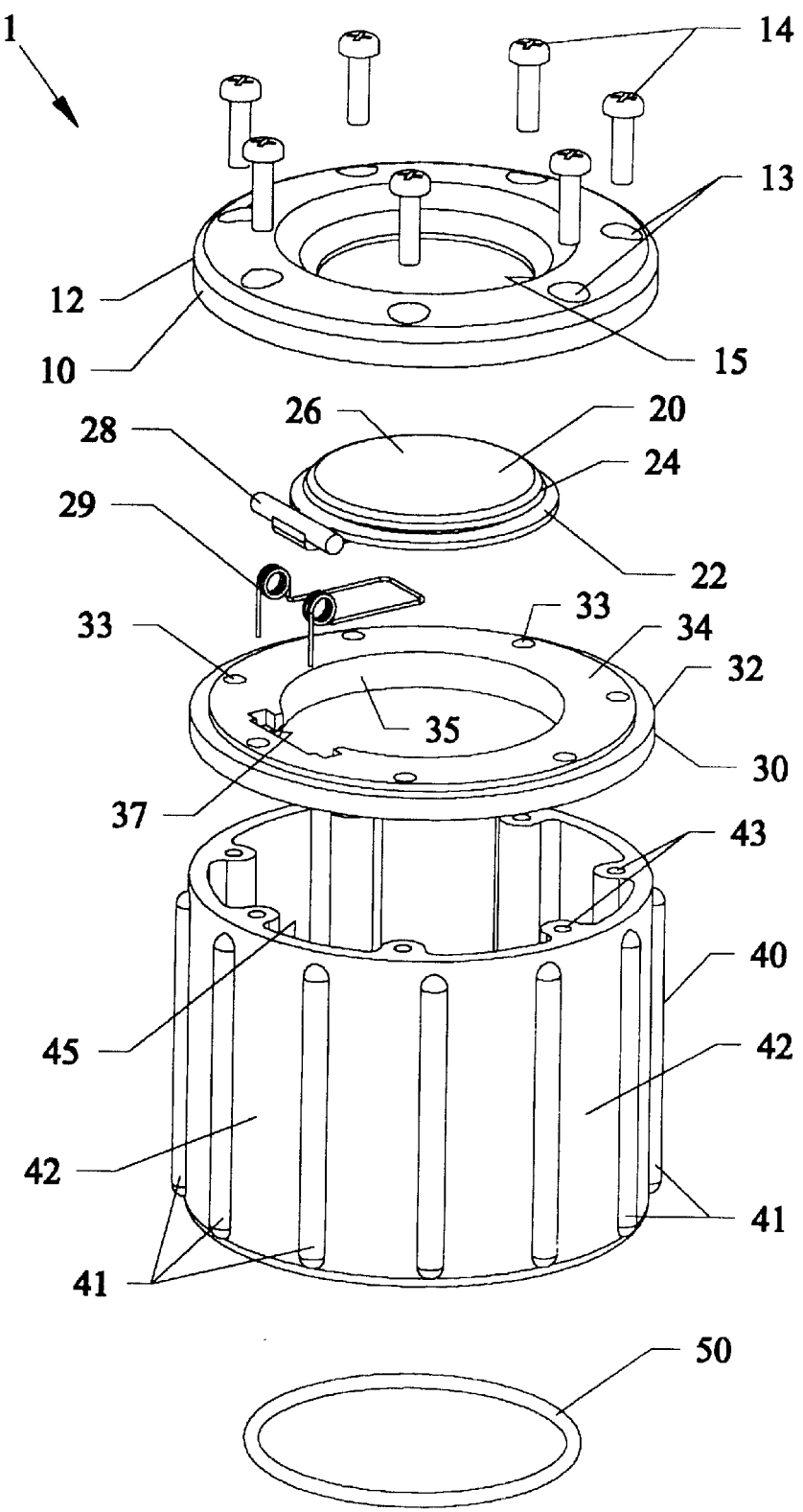
FIG. 6 is an exploded view of the fuel cap assembly of the preceding figures.

FIG. 1 is a top view of the fuel cap assembly invention 1. FIG. 2 is a side view of the fuel cap assembly 1 of FIG. 1 along arrow A. FIG. 3 shows the fuel cap assembly 1 of FIGS. 1–2 attached to a fuel tank 200 having external threads 215 about the fuel tank receptacle opening 210 with a fuel nozzle 100 approaching the cap assembly 1. FIG. 4 shows the fuel nozzle 100 of FIG. 3 penetrating the cap assembly 1 and fuel tank receptacle opening 210 of FIG. 3. FIG. 5A is a cross-sectional view of the cap assembly 1 of FIG. 1 along arrows 5A with the fuel nozzle 200 of FIG. 3 positioned above the cap assembly 1. FIG. 5B is another view of the cap assembly 1 of FIG. 5A attached to a fuel tank receptacle 210, with the nozzle 100 inserted through the door 20 of the fuel cap assembly 1. FIG. 6 is an exploded view of the fuel cap assembly 1 of the preceding figures.

Referring to FIG. 6, fuel cap assembly 1 includes upper cap lid portion 10 having exterior rounded perimeter surface 12, and a main opening 15 sized slightly larger than that of a conventional fuel nozzle. In the lid portion 10 are through-holes 13 in a ring pattern for allowing fasteners 12 such as screws to be inserted therethrough. Beneath the lid portion 10 can be a door 20 having a lower lip portion 22 which is larger than the diameter of the lid portion opening 15, and an upper portion 26 which has a diameter slightly smaller than the main opening 15 of the lid portion 10. To one side of the door is hinge pin 28 that can be molded thereon. A seal type gasket 30 can be positioned between the lid portion 10 and the main body housing 40. Gasket 30 can include a perimeter ridge 32 having an outer diameter identical to that of the perimeter surface 12 of the lid portion 12, and an inner portion 34 having being thicker than that of the perimeter ridge 32. Through-holes 33 through the inner portion 34 are in the same locations as that of the through-holes 13 of lid portion 10. An interior cutout 37 is sized to allow for supporting and holding the spring-loaded hinge 29 therein. Main body housing 40 can include raised exterior ridges 41 for allowing an enhanced grip for users of the cap assembly 1. The exterior diameter of the outer perimeter 42 of the housing 40 can be similar to outer diameter of the lid portion 10 and gasket 30. Housing 40 can also include through-holes that have internal threads for allowing the fasteners 14 to pass and connect thereto. Inside housing 40(better shown in FIGS. 5A–5B, is a lower inwardly protruding portion 48 having inwardly facing threads 47 thereon. Above the threads 47 can be an inwardly protruding ledge 46 with an O-ring type seal 50 positioned thereunder, whose purpose of which will be explained in reference to the other figures. The cross-sectional view in FIG. 5A shows the cap assembly 1 being fully assembled, with the screw fasteners 14 holding the lid portion to the main body housing 40 with the exterior perimeter ridge 32 of the gasket 30 sandwiched therebetween.

Referring to FIGS. 1–6, the cap assembly 1 is initially attached to a fuel tank 200 on a large vehicle such as a pickup truck, or larger trucks, or on buses, and the like. The fuel tanks 200 can be external fuel tanks with receptacle openings 210 having exterior facing threads 215 on the receptacle openings 210. The interior facing threads 47 of the novel cap assembly 1 are rotated about the exterior facing threads 215 on the fuel tank receptacle opening 210 until the O-ring 50 in the cap assembly 1 seals against the upper edge of the fuel tank receptacle opening 210. When the cap assembly 1 is attached to the fuel tank receptacle opening 210, the hinge 29 keeps door 20 in a horizontal closed position with lower lip portion 22 of the door 20 abutting against the lower surface of lid portion 10 completely closing off main opening 15 of the lid portion.

As the fuel nozzle 100 moves in the direction of arrow M1 (FIG. 5A), the door 20 of the cap assembly 1 moves downward pivotally rotating in the direction of arrow R as shown by FIG. 5B, until the nozzle 100 is able to access the interior of the receptacle opening 210. A slightly sloped portion 16 on edge of the opening 15 of the lid portion 10 also aids in directing the fuel nozzle 100 into the cap assembly 1. As shown by FIG. 5B, fueling can safely begin while the nozzle has not yet reached the inside of the fuel receptacle opening 210. Thus, in instances where the fuel nozzle handle 110 can not be extended to reach far enough, the several inch height of the main body housing 40 can act as an extender to allow for safe fuel filling without having to reach the nozzle 100 into the fuel receiving receptacle 210.

When fuel refilling is completed, the nozzle 100 is removed and the door 20 of the novel cap assembly 1 goes back to a closed position as shown by FIG. 5A.

As can be seen by the novel cap assembly 1, the narrow opening 15 of cap assembly can deflect fuel spillage from falling out during fuel filling of the fuel tank 200. Additionally, the extra height gained by having the main body 40 is several inches(approximately three to approximately six inches also helps prevent fuel spillage from occurring. Still furthermore, the inner diameter 45 of the main body housing 40 being larger than that of the lid portion 10 and gasket 20 also acts as a buffer to catch any splashing and/or spilling fuel from reaching outside the cap assembly 1 during fuel filling of the tank 200.

The components of the novel fuel cap assembly 1 can be formed from injection molded plastic, and use durable materials such as rust resistant metal for the fasteners 14 and spring member 29. Additionally, some parts such as the entire door 20 or portions of the door such as the lower lip portion 22 can be formed from another material such as rubber and the like to form a better seal.

Although the preferred embodiment shows multi-parts to the cap assembly, the cap assembly can be formed from less or more parts.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A fuel cap assembly for vehicle fuel tanks, comprising in combination:

a fuel tank on a large vehicle having a fuel receptacle opening with external facing threads on the receptacle opening;

a fuel cap cover having a lid portion and annular side portions with interior facing threads;

a gasket sandwiched between the lid portion of the cap cover and the annular side portions of the cap cover; and a door in the lid portion of the cap cover, which can open and close while the cap cover is attached to the fuel receptacle opening on the fuel tank.

2. The fuel cap assembly of claim 1, wherein the vehicle includes:

a truck.

3. The fuel cap assembly of claim 1, wherein the vehicle includes:

a bus.

4. The fuel cap assembly of claim 1, wherein the fuel tank includes:

an external fuel tank on the vehicle.

5. The fuel cap assembly of claim 1, wherein the annular side portions of the cap cover include:

a cavity portion having an interior diameter larger than the diameter of the door, and larger than the diameter of the external threads on the fuel receptacle opening, the cavity portion for catching fuel splashing and spills during fuel filling of the tank.

6. The fuel cap assembly of claim 1, wherein the annular side portions of the cap cover include:

an extended length for allowing fuel nozzle to fill the fuel tank without having the nozzle be inserted into the tank.

7. The fuel cap assembly of claim 1, further comprising:

a screwable fastener for attaching the lid portion of the cap cover to the annular side portions of the cap cover.

8. The fuel cap assembly of claim 1, further comprising:

a spring loaded hinge for attaching the door to the lid portion, the spring loaded hinge keeping the door in a closed position when not being used, and in an open position when a fuel nozzle is inserted into the fuel tank.

9. The fuel cap assembly of claim 8, wherein the door further includes a diameter larger than the fuel nozzle and smaller than the fuel receptacle opening.

10. The fuel cap assembly of claim 1, wherein the annular side portions further include:

an interior protruding ledge with a sealable member which seals against an upper edge of the receptacle opening to the fuel tank.

11. The fuel cap assembly of claim 10, wherein the sealable member includes:

an O-ring seal sandwiched between the interior protruding edge and the upper edge of the fuel receptacle opening.

12. A fuel cap for reducing spills and fumes during fuel tank refilling, comprising:

a lid portion having an exterior diameter and an opening therethrough for allowing a fuel nozzle to be inserted;

a retractable door for closing off the opening of the lid portion; and a main housing beneath the lid portion having internally facing threads for attaching the main housing about external facing threads on a receptacle opening to a fuel tank, and an interior protruding ledge with a sealable member which seals against an upper edge of the receptacle opening to the fuel tank, wherein the assembly reduces fuel fumes and spillage from reaching outside the fuel tank during the filling of the fuel tank.

13. The fuel cap of claim 12, wherein the main housing includes:

an upper portion having an opening with a diameter smaller than the exterior diameter of the lid portion; and a middle portion having an interior diameter larger the diameter of the upper portion; and a lower portion having a diameter smaller than the middle portion, wherein the interior diameter of the middle portion forms a cavity for trapping fuel spills therein.

14. The fuel cap of claim 12, wherein the main housing includes:

an extended length for allowing a fuel nozzle to fill the fuel tank without having the nozzle reach into the receptacle to the fuel tank.

15. The fuel cap assembly of claim 12, wherein the sealable member includes:

an O-ring seal sandwiched between the interior protruding edge and the upper edge of the fuel receptacle opening.

16. The fuel cap of claim 12, further comprising:

a gasket sandwiched between the lid portion and the main housing.

17. The fuel cap of claim 12, further comprising:

a screwable fastener for attaching the lid portion of the cap cover to the main housing.

18. A fuel cap assembly for vehicle fuel tanks, comprising in combination:

a fuel tank on a vehicle having a fuel receptacle opening with external facing threads on the receptacle opening;

a fuel cap cover having a lid portion and annular side portions with interior facing threads;

a screwable fastener for attaching the lid portion of the cap cover to the annular side portions of the cap cover; and a door in the lid portion of the cap cover, which can open and close while the cap cover is attached to the fuel receptacle opening on the fuel tank.

19. The fuel cap assembly of claim 18, wherein the annular side portions further include:

an interior protruding ledge with a sealable member which seals against an upper edge of the receptacle opening to the fuel tank.

20. The fuel cap assembly of claim 19, wherein the sealable member includes:

an O-ring seal sandwiched between the interior protruding edge and the upper edge of the fuel receptacle opening.

* * * * *